United States Patent [19]

Kinoshita et al.

[11] Patent Number: 5,186,296
[45] Date of Patent: * Feb. 16, 1993

[54] CENTERING BLOCK FOR ONE-WAY CLUTCH

[75] Inventors: Yoshio Kinoshita, Ayase; Shigeaki Koshino, Ohisomachi; Atsushi Sagae, Fujisawa, all of Japan

[73] Assignee: NSK-Warner K.K., Tokyo, Japan

[*] Notice: The portion of the term of this patent subsequent to Aug. 4, 2009 has been disclaimed.

[21] Appl. No.: 660,846

[22] Filed: Feb. 26, 1991

[30] Foreign Application Priority Data

Mar. 1, 1990 [JP] Japan ................. 2-19477[U]

[51] Int. Cl.$^5$ .................. F16D 41/07; F16D 13/74
[52] U.S. Cl. .................. 192/41 R; 192/113 B
[58] Field of Search ............ 192/113 B, 45, 45.1, 192/41 R; 384/465, 466, 470, 474

[56] References Cited

U.S. PATENT DOCUMENTS

| 4,106,602 | 8/1978 | Dieckerman | 192/45 |
| 4,953,353 | 9/1990 | Lederman | 192/45 X |

FOREIGN PATENT DOCUMENTS

| 2601735 | 1/1988 | France | 192/113 B |
| 1303816 | 1/1973 | United Kingdom | 192/113 B |

Primary Examiner—Rodney H. Bonck
Attorney, Agent, or Firm—Shapiro and Shapiro

[57] ABSTRACT

A one-way clutch comprises an inner ring, an outer ring concentric with the inner ring, clutch members disposed between the inner and the outer rings and allowing rotation only in one direction, and a centering block disposed between adjacent clutch members. The centering block includes a sliding portion slidably contacting one of the inner and outer rings, a pair of fixed portions fixed to the other of the inner and outer rings, and two supporting portions connecting the sliding portion and the fixed portions. A respective lubricating oil hole is provided in at least one supporting portion and/or the sliding portion.

6 Claims, 5 Drawing Sheets

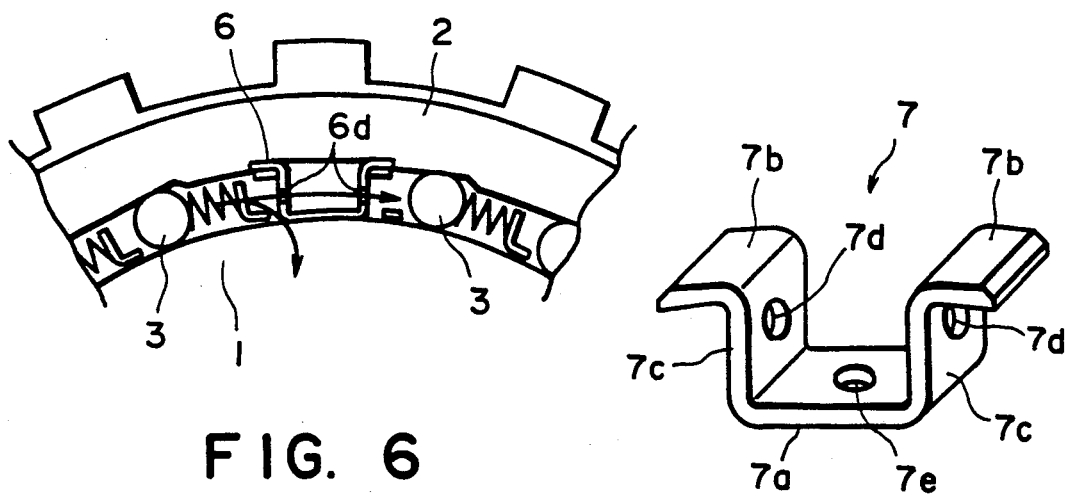
FIG. 6
FIG. 7
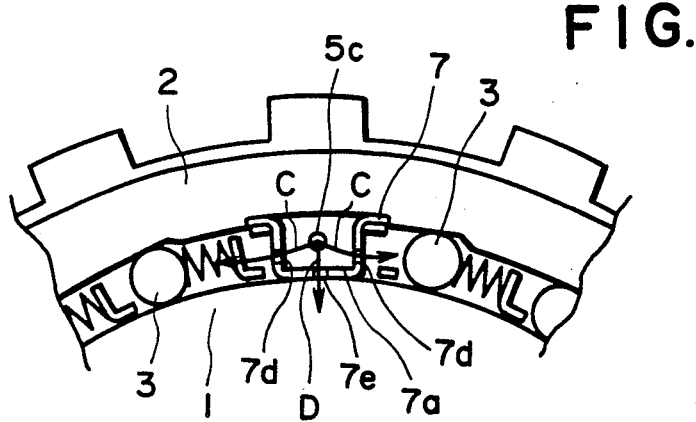
FIG. 8
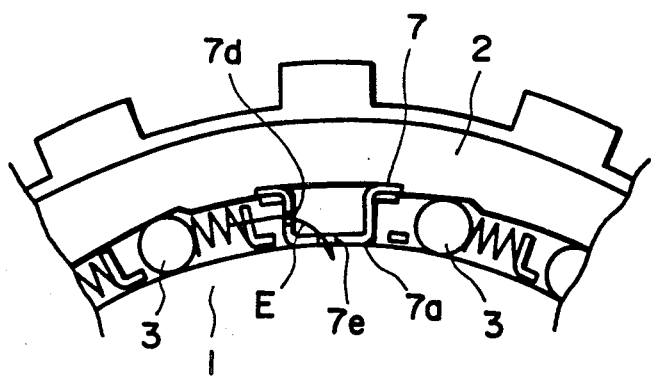
FIG. 9

CENTERING BLOCK FOR ONE-WAY CLUTCH

BACKGROUND OF THE INVENTION

1. Field of the Invention

This invention relates to a sliding bearing, namely, a pad bearing or centering bearing for a one-way clutch to be used for torque transmission, back stop or overrunning in or automobile automatic variable speed device, and more particularly to a centering block for leading lubricating oil to a clutch member, e.g., sprag or roller.

2. Related Background Art

FIGS. 10 and 11 show a conventional one-way clutch. In FIG. 10, the one-way clutch includes an inner ring 1, an outer ring 2, and rollers 3 interposed between these rings. Cam surfaces such as illustrative cam surface 2a are formed at the inner peripheral surface of outer ring 2 to form cam structures with rollers 3 so as to allow rotation of inner ring 1 relative to outer ring 2 in only one direction. Inner ring 1 freely runs relative to outer ring 2 in arrow direction A. In FIG. 11, at one side surface of outer ring 2, a step 2b is formed, and a first side plate 4 is mounted on step 2b, centering the side plate 4. First side plate 4 covers first end surfaces of rollers 3, and parts of the plate 4 are folded to form folded pieces 4a, which penetrate between the inner and outer rings.

A front end portion 4b of each piece 4a projects out from the other side. At the other side of outer ring 2, a second side plate 5 covering the other end surfaces of rollers 3 is arranged. Second side plate 5 has small holes 5a through which the folded pieces 4a project and front end portions 4b of the pieces 4a are caulked at the outer surface of second side plate 5 so as to center second side plate 5 and to fix both side plates 4 and 5 to outer ring 2.

Between outer ring 2 and inner ring 1, a centering block 6 is disposed. This centering block 6 has a sliding part 6a slidingly contacting with inner ring 1, folded portions 6b engaging with a recess 2c in the inner peripheral surface of outer ring 2 and supported by corresponding folded pieces 4a, and supporting portions 6c connecting sliding portion 6a and folded portions 6b. The folded portions 6b are supported by the folded pieces 4a so that the centering block 6 is fixed to recess 2c of outer ring 2.

Inner ring 1 has a lubricating hole 1a for feeding lubricating oil. The hole 1a penetrates from the outer peripheral surface to the inner peripheral surface of the ring. Inner ring 1 has a groove 1b at its inner peripheral surface and lubricating oil is received in groove 1b for supply of the oil to rollers 3 through lubricating hole 1a by centrifugal force. The one-way clutch is, as shown in FIG. 12, fixed to a plate 100 by welding.

According to the conventional one-way clutch, the lubricating oil hole is provided to supply lubricating oil to the rollers or sprags. However, this hole produces stress concentration which causes damage and reduces service life, and the working of this hole is complex, resulting in high cost. In addition, the one-way clutch becomes heavy and bulky, which is also disadvantageous. Further, the lubricating oil supplied to the one-way clutch from the conventional lubricating oil hole is, as shown in FIG. 13, discharged out of the one-way clutch as the flow of the oil is blocked by the centering block, and this requires a large amount of lubricating oil.

SUMMARY OF THE INVENTION

According to the present invention, a one-way clutch is provided which comprises an inner ring; an outer ring concentrically disposed about said inner ring; a plurality of torque transmitting members disposed between said inner and outer rings for allowing relative rotation between said rings in one direction and preventing relative rotation between said rings in an opposite direction; a centering block disposed between adjacent torque transmitting members and having a sliding portion slidingly contacting one of said inner and outer rings, a pair of fixed portions fixed to the other of said inner and outer rings, and a pair of supporting portions connecting said sliding portion and said fixed portions; and means for introducing lubricating oil from outside the clutch into a space between said supporting portions, with at least one said supporting portion or said sliding portion being provided with means defining a penetrating hole therethrough for discharging said lubricating oil.

With the structure of the present invention, the lubricating oil is thus supplied between the two supporting parts of the centering block and then discharged into the clutch assembly through the penetrating hole(s).

BRIEF DESCRIPTION OF THE DRAWINGS

FIG. 6 is an explanatory drawing of the flow of the lubricating oil in the centering block of the first embodiment;

FIG. 7 shows a perspective view of the centering block for use in a second embodiment;

FIGS. 8 and 9 are explanatory drawings of the flow of the lubricating oil in the second embodiment;

DESCRIPTION OF THE PREFERRED EMBODIMENTS

Figure 1:
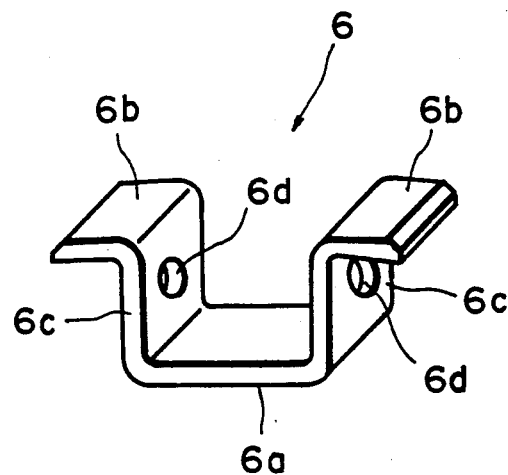
FIG. 1 shows a perspective view of a centering block for use in a first embodiment of a one-way clutch according to the invention.
Figures 2, 3:
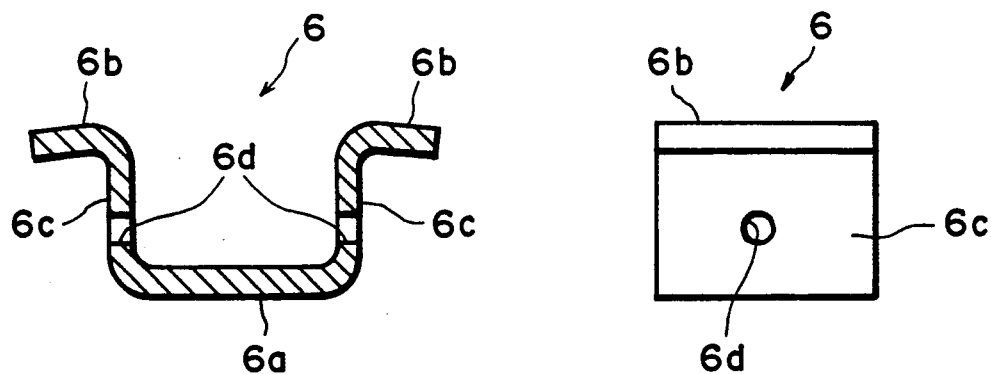
FIG. 2 shows a cross sectional view of the centering block.
FIG. 3 shows a side view of the centering block.
Figure 4:
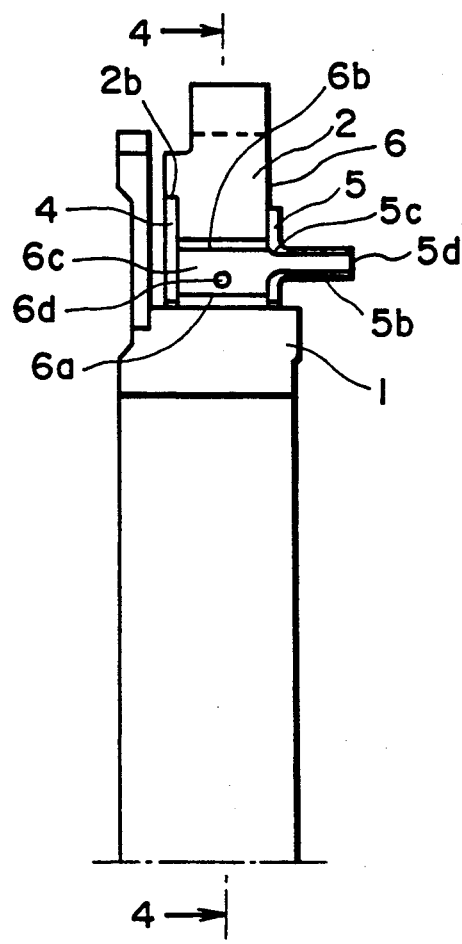
FIG. 4 shows a longitudinal cross sectional view of a one-way clutch equipped with the centering block, in accordance with a first embodiment of the invention.
Figure 10:
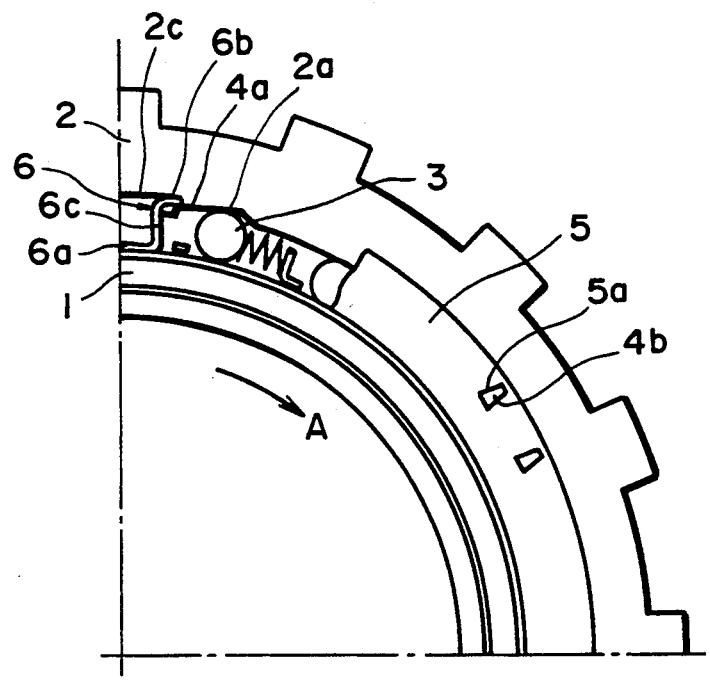
FIG. 10 shows a partial cross sectional front view of a one-way clutch equipped with a conventional centering block.
Figure 12:
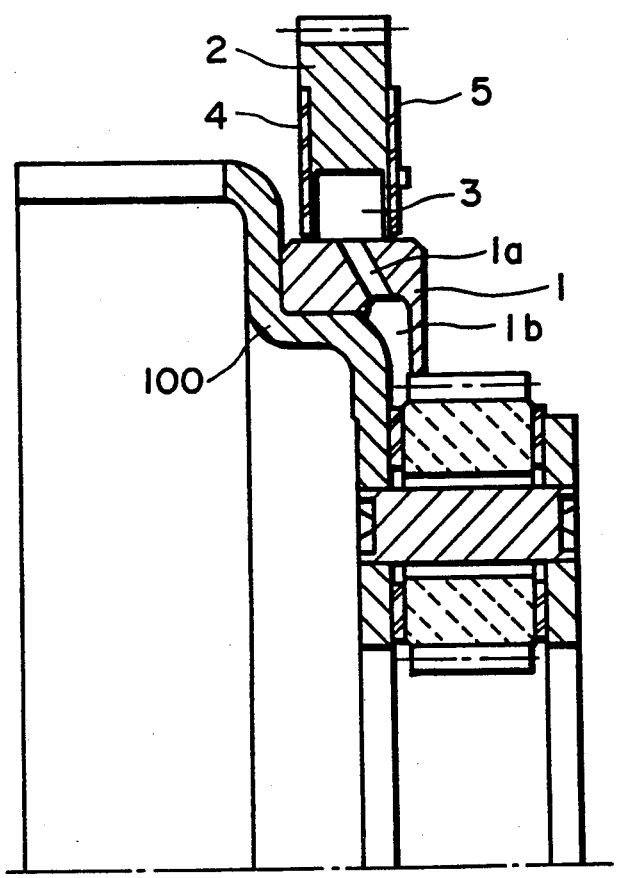
FIG. 12 shows the use of the conventional one-way clutch.
Figure 13:
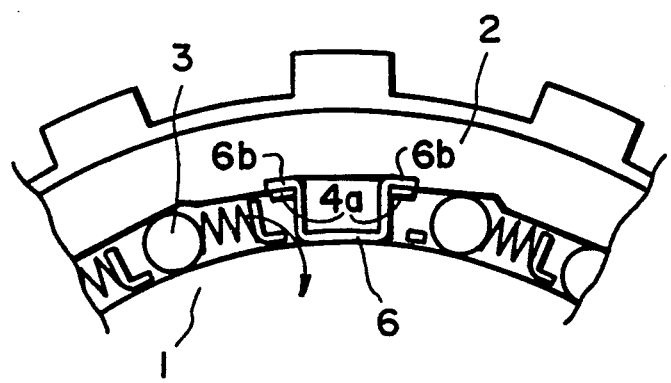
FIG. 13 is an explanatory drawing illustrating the flow of the lubricating oil in the conventional one-way clutch.

Referring to FIGS. 1-5, a one-way clutch according to a first embodiment of the present invention may comprise an inner ring 1 and outer ring 2 as shown in FIG. 4, and rollers 3 disposed between the inner and outer rings. Cam surfaces 2a are formed at the inner peripheral surface of outer ring 2 and each cam surface 2a and corresponding roller 3 constitute a cam structure, effective so that inner ring 1 can rotate relative to outer ring 2 in only one direction. At the side surface of outer ring 2 a step 2b is formed and a first side plate 4 is mounted on step 2b, thus centering first side plate 4, which covers first end surfaces of rollers 3. Parts of the plate 4 are folded to form folded pieces 4a, which penetrate between inner ring 1 and outer ring 2, and the front end 4b of each folded piece 4a projects out from the other side. At the other side of outer ring 2, a second side plate 5 covers the other end surfaces of rollers 3. Second side plate 5 has small holes 5a similar to those shown in FIG. 10, and the front end of each folded piece 4a of first side plate 4 projects out of a corresponding small hole 5a and is caulked at the outer surface of second side plate 5. Thus second side plate 5 is centered, and both side plates 4 and 5 are fixed to outer ring 2. A tubular projection 5b is provided on second side plate 5, and one end of the projection 5b has an opening 5c communicating to the inside of second side plate 5 with the space between support portions 6c. At the other end of the projection 5b, an opening 5d is provided communicating to the outside of the one-way clutch. Opening 5d communicates with a lubricating oil source (not shown) for supplying lubricating oil to the inside of second side plate 5.

Centering block 6 is arranged between inner and outer rings 1 and 2. Centering block 6 comprises a sliding portion 6a which slidingly contacts with inner ring 1, folded portions 6b and supporting portions 6c which connect portions 6a and 6b as shown. At each supporting portion 6c, a lubricating oil hole 6d is provided.

Centering block 6 has each folded portion 6b supported by a folded piece 4a so as to be fixed to corresponding recess 2c of outer ring 2.

Figure 5:
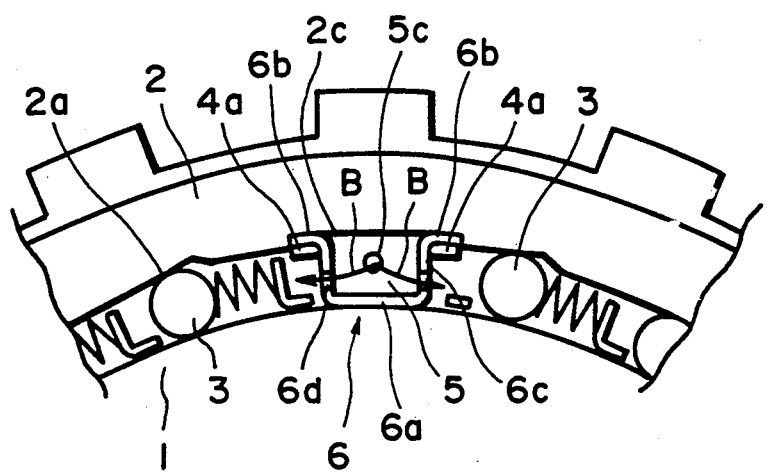
FIG. 5 shows a lateral cross sectional view of the one-way clutch of the first embodiment.
Figure 11:
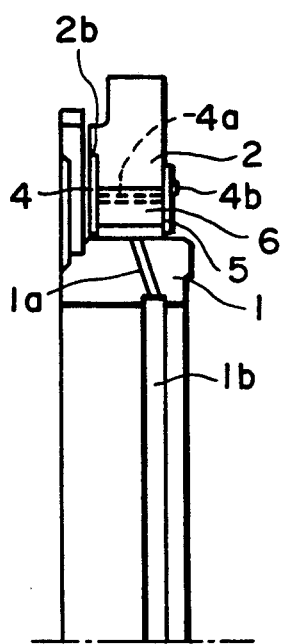
FIG. 11 shows a longitudinal cross sectional view of the one-way clutch equipped with the conventional centering block.

Lubricating oil is supplied to centering block 6 through tubular projection 5b of second side plate from the lubricating oil supply source (not shown), and, as shown by arrows B in FIG. 5, the lubricating oil is supplied to rollers 3 through the holes 6d in centering block 6.

As shown in FIG. 6, lubricating oil within the one-way clutch can circulate within the one-way clutch through the holes 6d without being blocked by centering block 6.

FIG. 7 shows a centering block 7 used in a second embodiment of the invention which is illustrated in FIGS. 8 and 9. Each supporting portion 7c of centering block 7 has a lubricating oil hole 7d, and sliding portion 7a has a lubricating hole 7e. Consequently, lubricating oil coming from the lubricating oil supply source through tubular projection 5b of second side plate 5 is, as shown by arrows C in FIG. 8, supplied to rollers 3 through lubricating oil holes 7d of centering block 7, and as shown by arrow D, supplied to the bearing surface of sliding portion 7a through the hole 7e of centering block 7.

In the second embodiment, lubricating oil circulating within the one-way clutch can be supplied to the bearing surface of sliding portion 7a through the holes 7d and 7e as shown by arrow E in FIG. 9.

According to the present invention, lubricating oil supplied to the centering block can be supplied to the torque transmitting members through the lubricating holes provided at the centering block. Further, it is also possible to directly supply the lubricating oil to the bearing surface of the sliding portion of the centering block. Consequently, there is no necessity to provide a lubricating hole in the inner ring or outer ring, and the lifetime of the one-way clutch can be extended. Further, the strength of the one-way clutch can be increased so that the one-way clutch becomes compact and lightweight. Moreover, working of the lubricating oil holes in the centering block is much easier than working a hole in the inner or outer ring, which brings the cost down.

While the principles of the invention have been explained with reference to the preferred embodiments illustrated in the drawings, it will be readily appreciated that the present invention is not limited to the above explained embodiments.

What is claimed is:

1. A one-way clutch which comprises an inner ring; an outer ring concentrically disposed about said inner ring; a plurality of torque transmitting members disposed between said inner and outer rings for allowing relative rotation between said rings in one direction and preventing relative rotation between said rings in an opposite direction; a centering block disposed between adjacent torque transmitting members and having a sliding portion slidingly contacting one of said inner and outer rings, a pair of fixed portions fixed to the other of said inner and outer rings, and a pair of supporting portions connecting said sliding portion and said fixed portions; and means for introducing lubricating oil directly from an outside oil supply into a space between said supporting portions, with at least one said supporting portion or said sliding portion being provided with means defining a penetrating hole therethrough for discharging said lubricating oil.

2. A one-way clutch according to claim 1, wherein a respective said penetrating hole is provided in each of said supporting portions.

3. A one-way clutch according to claim 1, wherein respective said penetrating holes are provided in each of said supporting portions and in said sliding portion.

4. A one-way clutch according to claim 1, wherein said introducing means comprises a side plate disposed to one side of one of said inner and outer rings and having means defining a lubricating oil supply passageway therethrough in communication with said space between said supporting portions of said centering block.

5. A one-way clutch according to claim 4, wherein said passageway extends substantially in an axial direction of said inner and outer rings.

6. A one-way clutch according to claim 1, wherein said lubricating oil is introduced into said space between said supporting portions of said centering block substantially in an axial direction of said inner and outer rings.

* * * * *